(12) United States Patent
Kong et al.

(10) Patent No.: US 9,690,843 B2
(45) Date of Patent: Jun. 27, 2017

(54) DATA CLASSIFICATION

(71) Applicant: Alibaba Group Holding Limited, Grand Cayman (KY)

(72) Inventors: Baihan Kong, Hangzhou (CN); Mei He, Hangzhou (CN); Jie Zhou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/050,772

(22) Filed: Feb. 23, 2016

(65) Prior Publication Data

US 2016/0171081 A1 Jun. 16, 2016

Related U.S. Application Data

(63) Continuation of application No. 13/650,000, filed on Oct. 11, 2012, now Pat. No. 9,280,611.

(30) Foreign Application Priority Data

Oct. 12, 2011 (CN) .......................... 2011 1 0308148

(51) Int. Cl.
*G06F 17/30* (2006.01)

(52) U.S. Cl.
CPC .. *G06F 17/30598* (2013.01); *G06F 17/30327* (2013.01); *G06F 17/30961* (2013.01); *G06F 17/30994* (2013.01)

(58) Field of Classification Search
CPC ......... G06F 17/30864; G06F 17/30994; G06F 17/30914; G06F 17/30961

(Continued)

(56) References Cited

U.S. PATENT DOCUMENTS

| 5,915,257 A | 6/1999 | Gartung et al. |
| 6,055,515 A | 4/2000 | Consentino et al. |

(Continued)

FOREIGN PATENT DOCUMENTS

| CN | 101042705 A | 9/2007 |
| CN | 101763067 A | 6/2010 |

(Continued)

OTHER PUBLICATIONS

The Chinese Office Action from the Chinese Patent Office for Application No. 201110308148.8 mailed on Feb. 26, 2016, a counterpart foreign application of U.S. Appl. No. 13/650,000, 5 pages.

(Continued)

*Primary Examiner* — Jay Morrison
*Assistant Examiner* — Ken Hoang
(74) *Attorney, Agent, or Firm* — James J. DeCarlo; Greenberg Traurig

(57) ABSTRACT

The present disclosure provides a method and an apparatus for storing data classification structure. Based on an initial classification structure tree, a reorganized classification structure tree that stores data classifications structure differently from that of the initial classification structure is generated. As the reorganized classification structure tree is flexible, when maintaining data and searching data by using the search engine, the present techniques may quickly find the desired data, thereby reducing the heavy burden of the search engine under the conventional techniques to conduct data search and high pressure of conducting data maintenance and data search. Further, the present techniques may not only reduce the burden of the search engine, but also relieve the pressure for maintaining data and searching data.

20 Claims, 15 Drawing Sheets

(58) Field of Classification Search
USPC ...... 702/19, 20, 182; 707/E17.044, 999.003,
707/E17.014, 693, 803, 999.1, 999.101,
707/E17.005, E17.009, E17.01, E17.032,
707/E17.055, E17.058, E17.076, E17.091,
707/E17.108, E17.127, 602, 607, 609,
707/683, 740, 741, 769, 777, 781, 792,
707/797, 802, 999.005, 999.102, 999.104,
707/999.202, 999.203; 706/50, 52, 47,
706/14, 45, 46, 53
See application file for complete search history.

(56) References Cited

U.S. PATENT DOCUMENTS

| | | | |
|---|---|---|---|
| 6,055,540 | A | 4/2000 | Snow et al. |
| 6,360,227 | B1 | 3/2002 | Aggarwal et al. |
| 6,397,221 | B1 | 5/2002 | Greef et al. |
| 6,591,269 | B1 | 7/2003 | Ponnekanti |
| 6,711,585 | B1 | 3/2004 | Copperman et al. |
| 7,603,367 | B1 * | 10/2009 | Kanter ............... G06F 17/30 |
| 7,774,360 | B2 | 8/2010 | Sun et al. |
| 7,987,182 | B2 | 7/2011 | Slothouber et al. |
| 7,991,757 | B2 | 8/2011 | Kane, Jr. |
| 8,103,540 | B2 | 1/2012 | Gross |
| 8,140,479 | B2 | 3/2012 | Barlen et al. |
| 8,560,398 | B1 * | 10/2013 | Gregov ............... G06Q 30/06 705/26.2 |
| 2002/0027567 | A1 | 3/2002 | Niamir |
| 2003/0123452 | A1 | 7/2003 | Cox et al. |
| 2004/0230554 | A1 | 11/2004 | An et al. |
| 2004/0250237 | A1 | 12/2004 | Simonyi |
| 2006/0161529 | A1 | 7/2006 | Venguerov |
| 2006/0265364 | A1 | 11/2006 | Keith |
| 2006/0288275 | A1 | 12/2006 | Chidlovskii et al. |
| 2007/0150519 | A1 | 6/2007 | Palacios |
| 2007/0255552 | A1 | 11/2007 | Thiesson et al. |
| 2008/0154919 | A1 | 6/2008 | Barlen et al. |
| 2010/0076947 | A1 | 3/2010 | Kurapat et al. |
| 2010/0094875 | A1 | 4/2010 | Harrison et al. |
| 2010/0114902 | A1 | 5/2010 | Embley et al. |
| 2010/0161694 | A1 | 6/2010 | Sudhi |
| 2011/0035378 | A1 | 2/2011 | Scholz et al. |
| 2011/0307463 | A1 | 12/2011 | Kasterstein et al. |

FOREIGN PATENT DOCUMENTS

| | | |
|---|---|---|
| EP | 0644494 | 3/1995 |
| JP | H04230574 | 8/1992 |
| JP | H07085102 | 3/1995 |

OTHER PUBLICATIONS

The Office Action from the Chinese Patent Office for Application No. 201110308148.8 mailed on Oct. 27, 2015, a counterpart foreign application of U.S. Appl. No. 13/650,000, 7 pages.

The Chinese Office Action from the Chinese Patent Office for Application No. 201110308148.8 mailed on Apr. 1, 2015, a counterpart foreign application of U.S. Appl. No. 13/650,000, 12 pages.

Final Office Action for U.S. Appl. No. 13/650,000, mailed on Oct. 1, 2015, Baihan Kong, "Data Classification", 20 pages.

Office Action for U.S. Appl. No. 13/650,000, mailed on Nov. 14, 2013, Baihan Kong, "Data Classification", 18 pages.

Final Office Action for U.S. Appl. No. 13/650,000, mailed on Dec. 15, 2014, Baihan Kong, "Data Classification", 22 pages.

Final Office Action for U.S. Appl. No. 13/650,000, mailed on Feb. 28, 2014, Baihan Kong, "Data Classification", 20 pages.

Office Action for U.S. Appl. No. 13/650,000, mailed on Apr. 10, 2015, Baihan Kong, "Data Classification", 22 pages.

Office Action for U.S. Appl. No. 13/650,000, mailed on Jun. 11, 2014, Baihan Kong, "Data Classification", 21 pages.

PCT/US12/59794, PCT Invitation to Pay Additional Fees, mailing date Jan. 3, 2013, pp. 1-7.

PCT Search Report mailed Mar. 20, 2013 for International Applcation No. PCT/US12/59794.

The Japanese Office Action mailed Jul. 26, 2016 for Japanese patent application No. 2014-535883, a counterpart foreign application of U.S. Pat. No. 9,280,611, 7 pages.

* cited by examiner

DATA CLASSIFICATION

CROSS REFERENCE TO RELATED PATENT APPLICATIONS

This application is a continuation of U.S. patent application Ser. No. 13/650,000 filed on Oct. 11, 2012, which claims foreign priority to Chinese Patent Application No. 201110308148.8 filed on 12 Oct. 2011, entitled "Storage Method and System of Data Classification Structure," each of which is hereby incorporated by reference in their entirety.

TECHNICAL FIELD

The present disclosure relates to the field of data searching technology and, more specifically, to a method and a system of storing data classification structure.

BACKGROUND

With the development of the Internet, there are more and more online applications. E-commerce websites are popular. Merchants may set up virtual shops at some large e-commerce websites to conduct transactions. Thus, there is an influx of stored data at the e-commerce websites and a swamp of available data.

Conventional techniques use tree type classifications and characteristics information to manage the data, and publish, display, and search the data based on the data management. For example, when an e-commerce website receives a request to accept data, the e-commerce website classifies the accepted data based on preset standards. Data under the same classification are grouped together, thereby forming a large classification tree to be displayed at a display interface.

However, when a large volume of data is displayed at the display interface, it creates huge pressure to data maintenance and data searching at the e-commerce website, and creates a huge burden to a related search engine. For example, a user inputs Lenovo™ as a query. The Lenovo™ company has many different products, such as Lenovo™ phone, Lenovo™ laptop, Lenovo™ printer, Lenovo™ memory, etc. Lenovo™ phone belongs to the phone sub-classification under the communication tool classification, while Lenovo™ laptop belongs to the computer sub-classification under the communication tool classification. The two are different sub-classifications under a same parent classification. When the search engine searches Lenovo™ products, it may start from the communication tool classification and search different models of Lenovo™ phone under the phone sub-classification, re-start from the communication tool classification and search different models of Lenovo™ laptop under the computer sub-classification, and then re-start to search Lenovo™ printers and Lenovo™ memory until all Lenovo™ products are searched. Such searching process includes many unnecessary searches, thereby increasing the burden of the search engine and increasing pressure on the data maintenance and data searching.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

To reduce the burden on the search engine and the pressure to maintain data and search data, the present disclosure provides a method and a system of storing data classification structure. Based on an initial classification structure tree, the present techniques generate a reorganized classification structure tree to store the data classification structure. As the reorganized classification structure tree is flexible, when maintaining data and searching data by using the search engine, the present techniques may quickly find the desired data, thereby reducing the burden of the search engine and relieving the pressure to maintain data and search data.

The present disclosure provides a method of storing data classification structure. The present techniques may obtain an initial classification structure tree to store the data classification structure. The initial classification structure tree includes an initial root node representing data source characteristics and at least one level child node that describes classification characteristics. One or more leaf nodes store corresponding data.

The present techniques may then perform the following operations at least once to generate a reorganized classification structure tree to store the data classification structure and store the generated reorganized classification structure tree. The initial root node or a child node in the initial classification structure tree is determined as an initial root node of the reorganized classification structure tree. Among remaining nodes other than the determined root node or the child node in the initial classification structure tree, at least one node is determined as a child node of the reorganized classification structure tree. Based on the determined root node and child node of the reorganized classification structure tree, and using the corresponding data as leaf nodes of the reorganized classification structure tree, the present techniques generate the reorganized classification structure tree differently from the initial classification structure tree. For example, the initial classification structure tree that stores the data classification structure may be generated based on a standard classification structure tree when the data is published.

The present disclosure also provides a system of storing data classification structure. For example, the system may include a classification dimension module, a rule engine module, and a classification data module. The classification dimension module obtains an initial classification structure tree to store the data classification structure. The initial classification structure tree includes an initial root node representing data source characteristics and at least one level child node that describes classification characteristics. One or more leaf nodes store corresponding data.

The present techniques may then perform the following operations at least once to generate a reorganized classification structure tree to store the data classification structure and store the generated reorganized classification structure tree. The rule engine module determines the initial root node or a child node in the initial classification structure tree as an initial root node of the reorganized classification structure tree. Among remaining nodes other than the determined root node or the child node, the rule engine module determines at least one node as a child node of the reorganized classification structure tree. Based on the determined root node and child node of the reorganized classification structure tree, and using the corresponding data as leaf nodes of the reorganized classification structure tree, the rule engine module generates the reorganized classification structure tree differently from the initial classification structure tree. The classification date module stores the initial classification structure tree and the reorganized classification structure tree. For example, the initial classification structure tree that stores the data classification structure may be generated based on a standard classification structure tree when the data is published.

In addition, the present disclosure also provides a method of searching data based on the data classification structure generated based on the above method of storing data classification structure. The present techniques may display root nodes of an initial classification structure and each reorganized classification structure tree as guidance information of data source characteristics at a display interface. Based on data source characteristics selected by a user, a classification structure tree with a root node representing the selected data source characteristics is determined. A level-by-level guidance is provided to the user based on the determined classification structure tree until the user finds desired data. For example, the initial classification structure tree that stores the data classification structure may be generated based on a standard classification structure when the data is published.

The present disclosure also provides a system of searching data based on the data classification structure generated based on the above method of storing data classification structure. The system may include a data display module, a search engine module, and a data storage module. The data display module displays root nodes of an initial classification structure and each reorganized classification structure tree as guidance information of data source characteristics at a display interface. Based on data source characteristics selected by a user, the search engine module determines a classification structure tree with a root node representing the selected data source characteristics, and provides a level-by-level guidance to the user based on the determined classification structure tree until the user finds desired data. The data storage module stores the data and provides the data source. For example, the initial classification structure tree that stores the data classification structure may be generated based on a standard classification structure tree when the data is published.

One or more present techniques, based on an initial classification structure tree, generate a reorganized classification structure tree to store the data classification structure. As the reorganized classification structure tree is flexible, when maintaining data and searching data by using the search engine, the present techniques may quickly find the desired data, thereby reducing the heavy burden of the search engine under the conventional techniques to conduct data search and high pressure of conducting data maintenance and data search. Further, the present techniques may not only reduce the burden of the search engine, but also relieve the pressure for maintaining data and searching data.

BRIEF DESCRIPTION OF THE DRAWINGS

To better illustrate embodiments of the present disclosure, the following is a brief introduction of figures to be used in descriptions of the embodiments. It is apparent that the following figures only relate to some embodiments of the present disclosure. A person of ordinary skill in the art can obtain other figures according to the figures in the present disclosure without creative efforts.

DETAILED DESCRIPTION

The following is a detailed description of the present techniques by reference to the FIGs. The described embodiments herein are example embodiments and should not be used to restrict the scope of the present disclosure.

A first example embodiment of the present disclosure provides a method of storing a data classification structure. Based on an initial classification structure tree when data is published, different classification characteristics may be used as or represented by root nodes for the purpose of reorganization to generate different classification structure trees. Thus, different classification structure trees may be provided for the same data. When searching data, different guidance may be provided based on different classification structure trees, thereby reducing the problem of repetitive searching due to limited guidance.

Figure 1:
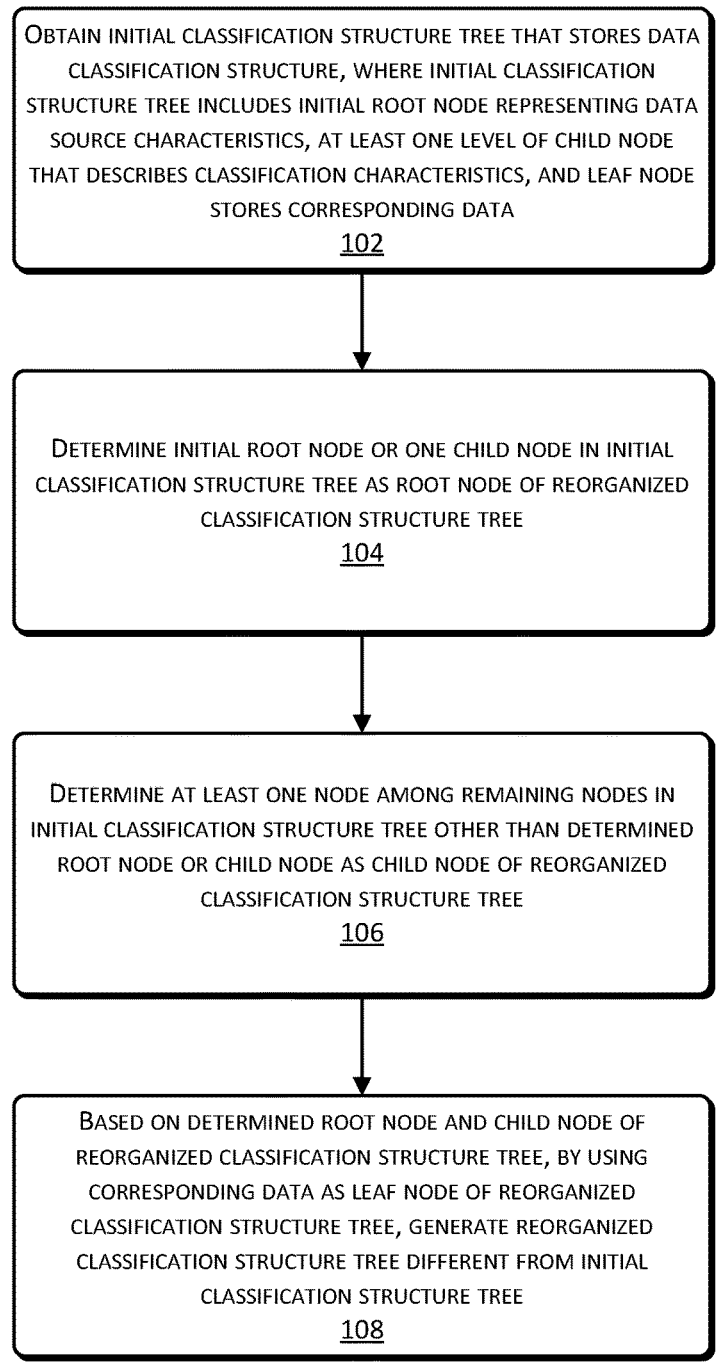
FIG. 1 illustrates a flowchart of an example method of storing data classification structure.

The following is a detailed description of the first example embodiment of the present disclosure by reference to FIG. 1. It should be understood that the first example embodiment is only used to illustrate instead of limit the present disclosure. Unless contradicted, one or more characteristics or features in different example embodiments in the present disclosure may be referenced to each other or combined in various ways.

FIG. 1 illustrates a flowchart of an example method of storing data classification structure. At 102, the present techniques may obtain an initial classification structure tree to store the data classification structure. The initial classification structure tree includes an initial root node representing data source characteristics and at least one level child node that describes classification characteristics. One or more leaf nodes store corresponding data.

Figure 1A:
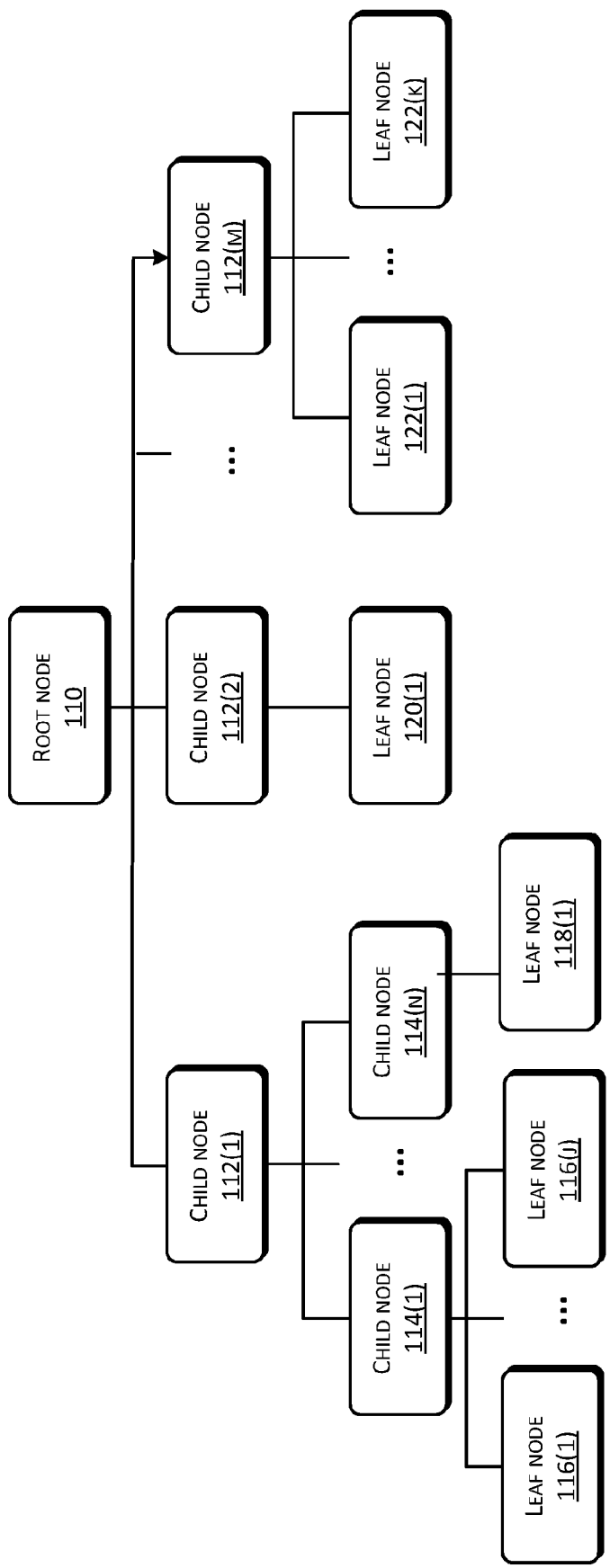
FIG. 1A illustrates a diagram of an example initial classification structure tree in accordance with a first example embodiment of the present disclosure.

FIG. 1A illustrates a diagram of an example initial classification structure tree. The initial classification structure tree includes an initial root node 110 representing data source characteristics and at least one level child node that describes classification characteristics. One or more leaf nodes store corresponding data. In the example of FIG. 1A, under the root node 110, a first level child nodes includes a child node 112(1), a child node 112(2), . . . , and a child node 112(m), where m may be any positive integer. Each child node may have its own level child nodes. In the example of FIG. 1A, under the child node 112(1) of the first level child nodes, there are a second level child nodes, which are a child node 114(1), . . . , a child node 114(n), where n may be any positive integer. Under the child node 114(1), there are one or more leaf nodes including a leaf node 116(1), . . . , a leaf node 116(j), where j may be any positive integer. Under the child node 112(2), there is a leaf node 120(1). Under the child node 112(m), there are one or more leaf nodes including a leaf node 122(1), . . . , a leaf node 122(k), where k may be any positive integer. For example, the initial classification structure tree that stores the data classification structure may be generated based on a standard classification structure when a publisher of the data publishes the data.

Figure 1B:
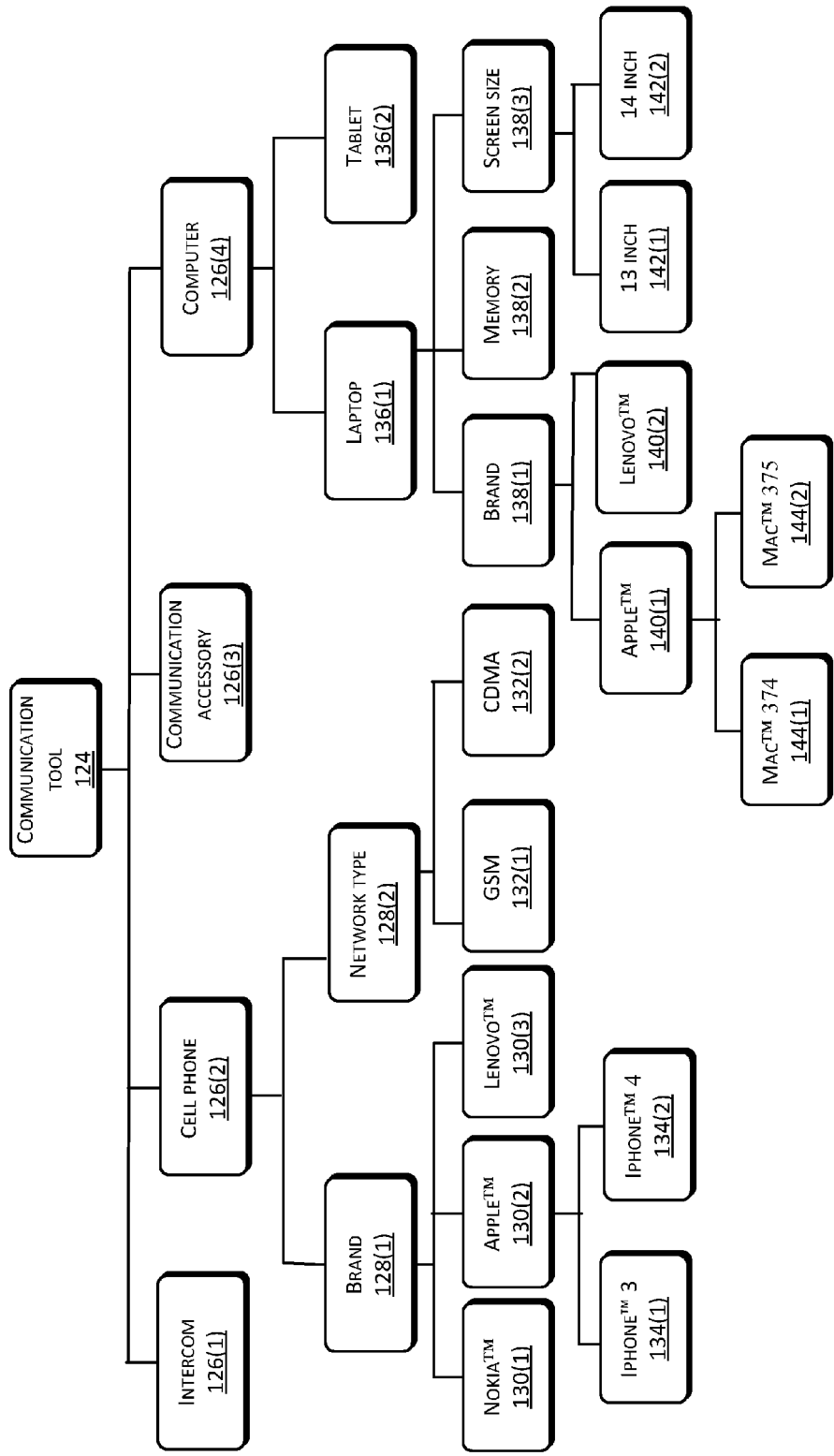
FIG. 1B illustrates a diagram of an example initial classifications structure tree of communication tool in accordance with the first example embodiment of the present disclosure.

Using a communication tool as an example, FIG. 1B illustrates a diagram of an example initial classification structure tree of the communication tool. An initial root node 124 representing data source characteristics is called communication tool. Under the root node communication tool 124, there are first level child nodes 126, which include, for example, an intercom 126(1), a cell phone 126(2), a communication accessory 126(3), and a computer 126(4). Under the first level child node cell phone 126(2), there are second level child nodes, which are a brand 128(1) and a network type 128(2). The second level child node brand 128(1) may have third level child nodes, which are a Nokia™ 130(1), an Apple™ 130(2), and a Lenovo™ 130(3). The second level child node network type 128(2) may have third level child nodes, which are global system for mobile communications (GSM) 132(1) and code division multiple access (CDMA) 132(2). The third level child node Apple™ 130(2) may have fourth level child nodes, which are Iphone™ 3 134(1), and Iphone™ 4 134(2). The fourth level child nodes Iphone™ 3 134(1), and Iphone™ 4 134(2) are leaf nodes of the child node cell phone 126(2) store the corresponding data.

The first level child node computer 126(4) may have second level child nodes such as a laptop 136(1) and a tablet 136(2). The second level child node laptop 136(1) may have its third level child nodes such as a brand 138(1), an internal memory storage capacity 138(2), and a screen size 138(3). The third level child node brand 138(1) may have fourth level child nodes, such as an Apple™ 140(1) and an Lenovo™ 140(2). The third level child node screen size 138(3) may have fourth level child nodes, such as 13 inch 142(1) and 14 inch 142(2). The fourth level child nodes 13 inch 142(1) and 14 inch 142(2) in the example of FIG. 1B are leaf nodes of the child node of screen size 138(3) that store the corresponding data. The fourth level child node Apple™ 140(1) may have fifth child nodes such as Mac™ 374 144(1) and Mac™ 375 144(2). The fifth level child nodes Mac™ 374 144(1) and Mac™ 375 144(2) in the example of FIG. 1B are the last level child nodes of the child node computer 126(4). The fifth level child nodes Mac™ 374 144(1) and Mac™ 375 144(2) are the leaf nodes of the child node computer 126(4) that store the corresponding data.

The listed initial classification structure tree herein is for illustration purpose in this example embodiment, and shall not be construed to limit this example embodiment. This example embodiment may also use any other initial classification structure tree of any other representations including different child nodes or leaf nodes or any other types of characteristics, such as female clothes as examples for illustration.

The present techniques may then perform the following operations at least once to generate a reorganized classification structure tree to store the data classification structure and store the generated reorganized classification structure tree.

At 104, the present techniques determine the initial root node or a child node in the initial classification structure tree as an initial root node of a reorganized classification structure tree. For example, based on the initial classification structure tree of the communication tool, its root node communication tool 124 or one of its child nodes such as the cell phone 126(2), the brand 128(1), or the Apple™ 130(2) may be used as the root node of the reorganized classification structure tree. For example, the following illustration uses Apple™ as the root node of the reorganized classification structure tree.

The child node Apple™ in the initial classification structure tree is determined as the root node of the reorganized classification structure tree to generate the reorganized classification structure tree of the series of products of Apple™.

At 106, among remaining nodes other than the determined root node or child node, the present techniques determine at least one node as a child node of the reorganized classification structure tree. For example, in the initial classification structure tree of the communication tool, the child node Apple™ is determined as the root node of the reorganized classification structure tree, and the other remaining nodes may all be used as the child nodes of the reorganization classification tree.

Based on the above initial classification structure tree, the Apple™ includes cell phone and laptop products. Thus, the child node cell phone and the child node laptop may be used as the first level child nodes of the reorganized classification structure tree. The child nodes Iphone™ 3 and Iphone™ 4 are the child nodes of the first level child node cell phone. The child nodes Mac™ 374 and Mac™ 375 are child nodes of the first level child node computer.

In this example, it is only for purpose of illustration that the child node Apple™ in the initial classification structure tree is selected as the root node of reorganization classification tree to store the data classification structure. Such example is not intended to limit the example embodiments. The present techniques may select one root node or child node from the above initial classification structure tree or any other initial classification structure tree as a root node of the reorganized classification structure tree, and select at least one node from the remaining nodes other than the selected root node or child node in the above initial classification structure tree or any other initial classification structure tree as the child node of the reorganized classification structure tree. For example, the Apple™ products are not limited to cell phones and computers, and may include other products such as cell phone accessory and computer chip while the child node cell phone accessory and child node computer chip are located in other initial classification structure trees. Based on the actual needs, the child nodes cell phone accessory and computer chip may be selected from other initial classification structure trees and merged into the reorganization classification tree related to Apple™ in this example embodiment.

At 108, based on the determined root node and child node of the reorganized classification structure tree, the corresponding data are used as leaf nodes of the reorganized classification structure tree and the reorganized classification structure tree differently from the initial classification structure tree is generated.

The determined root node and child node for the reorganized classification structure tree are ranked according to their levels to generate the reorganized classification structure tree different from the initial classification structure tree. The last level child nodes, i.e., the leaf nodes, such as Iphone™ 3, Iphone™ 4, Mac™ 374 and Mac™ 375 are used as the corresponding data for the corresponding child nodes.

Figure 1C:
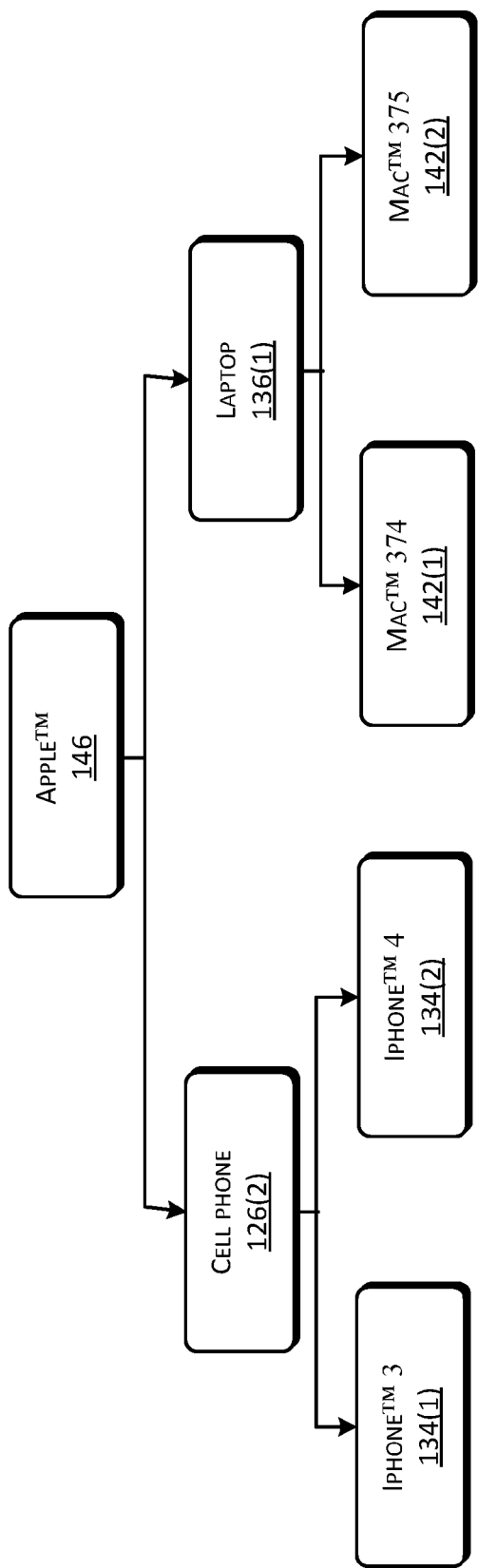
FIG. 1C illustrates a diagram of an example reorganized classification structure tree storing data classification structure based on the initial classification structure tree in accordance with the first example embodiment of the present disclosure.

FIG. 1C illustrates a diagram of an example reorganized classification structure tree based on the initial classification structure tree in FIG. 1B. Under a root node Apple™ 146, there are first level child nodes cell phone 126(1) and laptop 126(2). Under the first level child node cell phone, there are leaf nodes Iphone™ 3 134(1) and Iphone™ 4 134(2). Under the first level child node laptop 136(1), there are leaf nodes Mac™ 374 144(1) and Mac™ 375 144(2).

In this example, it is only for purpose of illustration that the child node Apple™ in the initial classification structure tree is selected as the root node of reorganization classification tree to store the data classification structure. For example, the root node Apple™ 146 may be selected by a user through either the child node Apple™ 130(2) or the child node Apple™ 140(1) in FIG. 1B.

Such example is not intended to limit the example embodiments. The present techniques may, based on the actual needs, generate the reorganized classification structure tree to store the data classification structure based on one or more initial classification structure trees. Alternatively, the present techniques may also generate multiple reorganized classification structure trees to store the data classification structure based on one initial classification structure tree. Alternatively, the present techniques may also generate one or more reorganized classification structure trees to store the data classification structure based on one or more initial classification structure trees. The one or more initial classification structure tree may be the same type or different types. For example, a type of a respective initial classification structure tree may be determined by data source characteristics represented by a respective root node of the respective initial classification structure tree.

Figure 1D:
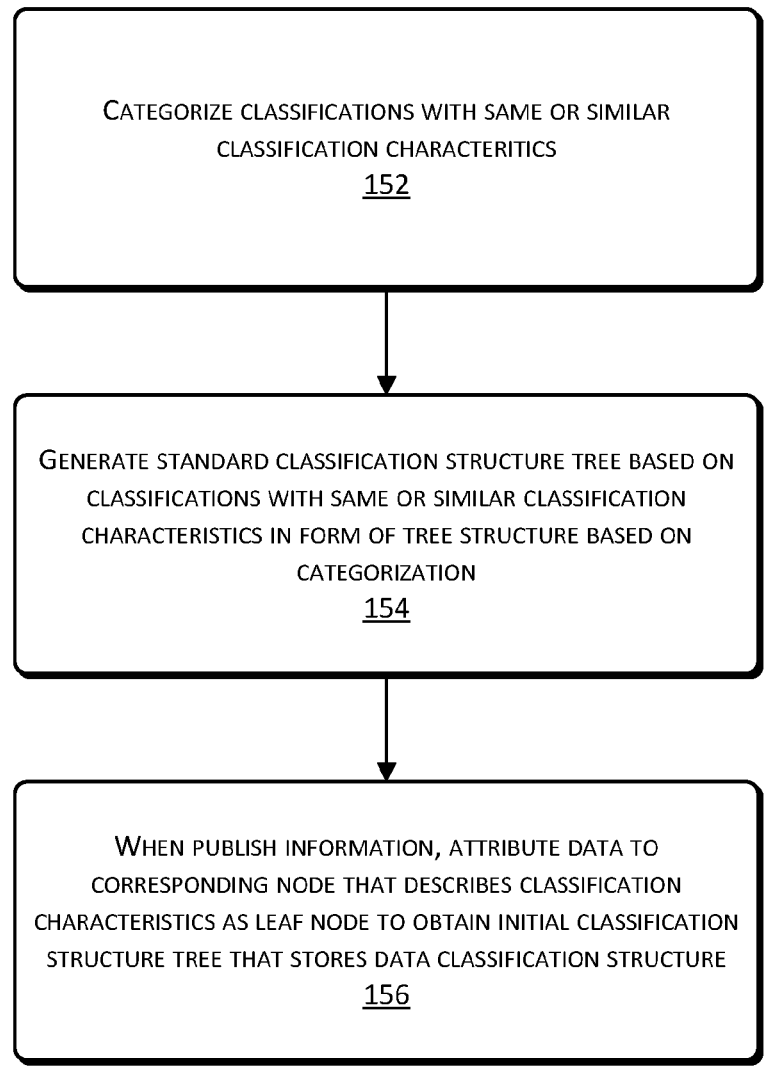
FIG. 1D illustrates a flowchart of an example generation of the initial classification structure in accordance with the first example embodiment of the present disclosure.

At 102, the present techniques, in the example of communication tool, describe the process to establish the standard classification tree of the communication tool and to establish the initial classification structure tree of the communication tool based on the standard classification tree of the communication tool by reference to FIG. 1D.

At 152, classifications with the same or similar characteristics are categorized together. For example, when the standard classification structure tree of communication tool is generated, the same or similar classifications are selected, such as the intercom, the cell phone, the communication accessory, and the computer. These four classifications all belong to the type of communication tool. The intercom and the cell phone are mobile communication tool. The computer is the Internet communication tool. The communication accessory is a tool to maintain or repair the communication tool. All these four classifications have the same or similar characteristics, and are thus categorized as classifications under the communication tool and used as child nodes of the root node communication tool. The cell phone may be further classified as cell phone based on brand or cell phone based on network type. The brand is used to classify the cell phones based on brands while the network type is to classify the cell phone based on communication technologies. For example, GSM type cell phone uses global mobile communication technologies. CDMA type cell phone uses channel access technologies. Thus, the GSM and the CDMA are categorized as network type classification. The brand type classification also may include multiple brands, such as the Nokia™, the Apple™, the Lenovo™, Samsung™, Tianyu™, etc. This example embodiment uses the examples of the Nokia™, the Apple™, and the Lenovo™.

The computer as a classification may be further classified as the laptop and the tablet. The laptop as a classification may be further divided based on brand, internal memory capacity, and screen size. That is, the brand, the internal memory capacity, and the screen size are classifications under the laptop classification. The brand as a classification may be further divided into multiple brands, such as the Apple™, Lenovo™, Acer™, Asus™, etc. This example embodiment uses the examples of Apple™ and Acer™.

At 154, based on the categorization, the classifications with the same or similar characteristics are used to generate the standard classification structure tree in a form of a tree structure. Based on the above categorization, the classifications with the same or similar characteristics are used to generate the standard classification structure tree based on the tree structure as shown in FIG. 1E.

Figure 1E:
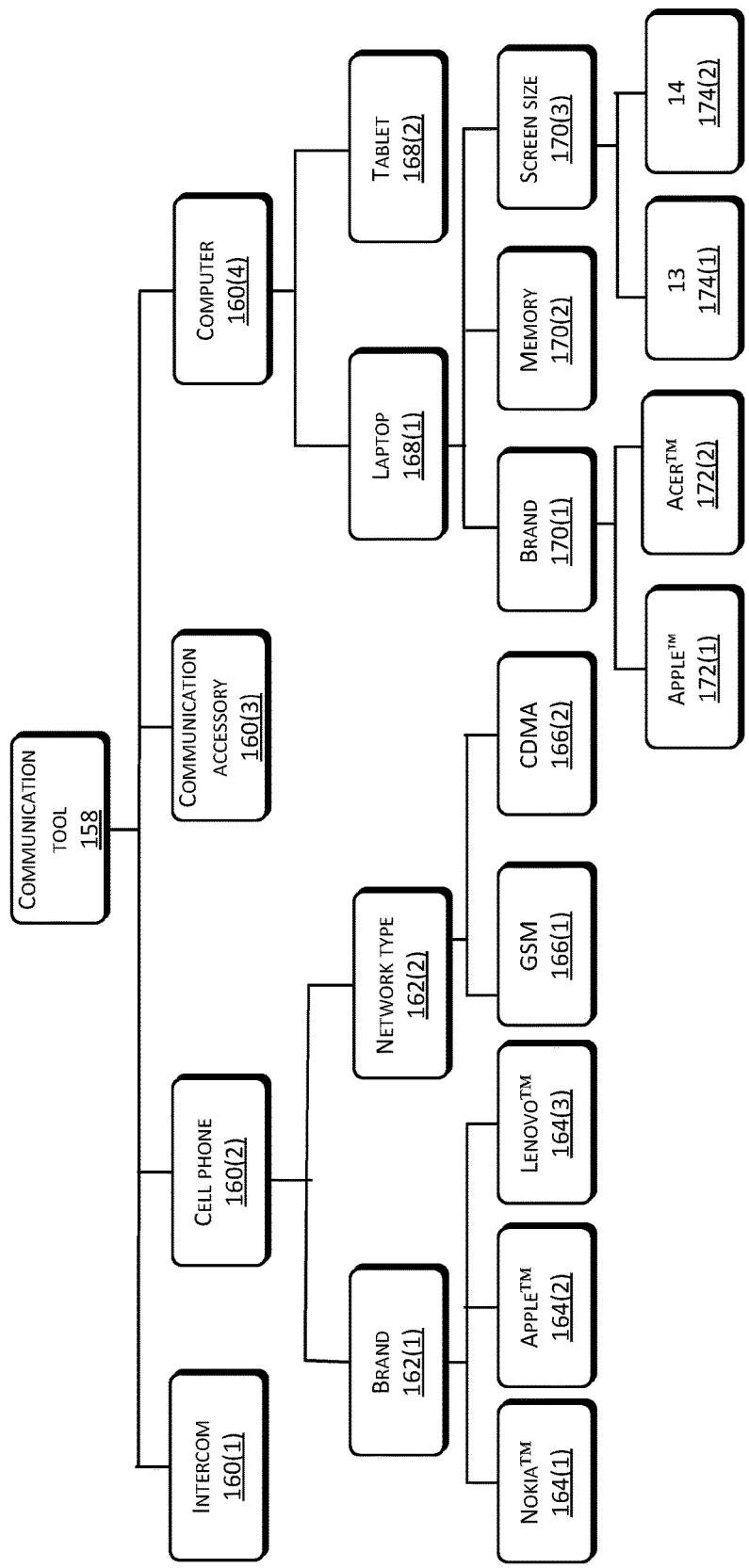
FIG. 1E illustrates a diagram of an example standard classification structure tree based on classifications with the same or similar classification characteristics in a form of tree structure in accordance with the first example embodiment of the present disclosure.

In the example of FIG. 1E, there is a root node communication tool 158. Under the root node 158, there are first level child nodes 160, which include an intercom 160(1), a cell phone 160(2), a communication accessory 160(3), and a computer 160(4). Under the first level child node cell phone 160(2), there are second level child nodes, which are brand 162(1) and network type 162(2). The second level child node brand 162(1) may have third level child nodes, which are a Nokia™ 164(1), an Apple™ 164(2), and a Lenovo™ 164(3). The second level child node network type 162(2) may have third level child nodes, which are GSM 166(1) and CDMA 166(2). The first level child node computer 160(4) may have second level child nodes, which are a laptop 168(1) and a tablet 168(2). The second level child node laptop 168(1) may have its third level child nodes, which are a brand 170(1), an internal memory storage capacity 170(2), and a screen size 170(3). The third level child node brand 170(1) may have fourth level child nodes, which are an Apple™ 172(1) and an Acer™ 172(2). The third level child node screen size 170(3) may have fourth level child nodes, such as 13 inch 174(1) and 14 inch 174(2).

The above standard classification structure tree is classified based on stipulated standards with a fixed classification structure. Information publishers select classification characteristics level-by-level based on the standard classification structure tree, and publish the data onto the leaf nodes, thereby forming the initial classification structure tree.

At 156, when data is published, corresponding data is associated with a child node with corresponding classification characteristics as the leaf node, thereby obtaining the initial classification structure tree that stores the data classification structure.

For example, corresponding to the child node Apple™ 164(2) under the child node cell phone 160(2), there are a series of brands under the Apple™, such as Iphone™ 4, Ipad™, Ipod™, etc. This example embodiment uses the example of Iphone™ 3 and Iphone™ 4, and uses data of the Iphone™ 3 and Iphone™ 4 as the data corresponding to the child node Apple™ 164(2) and classify them under the child node Apple™ 164(2) as the leaf nodes of the child node Apple™, such as the leaf nodes Iphone™ 3 134(1) and Iphone™ 4 134(2) in FIG. 1B. For the series of Apple™ products under the child node computer 160(4), there are computers such as Mac™ 374 and Mac™ 375. Thus, data of the Mac™ 374 and Mac™ 375 are classified as the data corresponding to the child node computer as the leaf nodes of the child node computer, such as the leaf nodes Mac™ 374 144(1) and Mac™ 375 144(2) in FIG. 1B. As data of the child node screen size, for example, 13 inch and 14 inch are classified as the data corresponding to the child node screen size as the leaf nodes of the child node screen size, such as the leaf nodes 13 inch 142(1) and 14 inch 144(2) in FIG. 1B. As shown above, FIG. 1B illustrates an example initial classification structure tree that stores the data classification structure.

Figure 2:
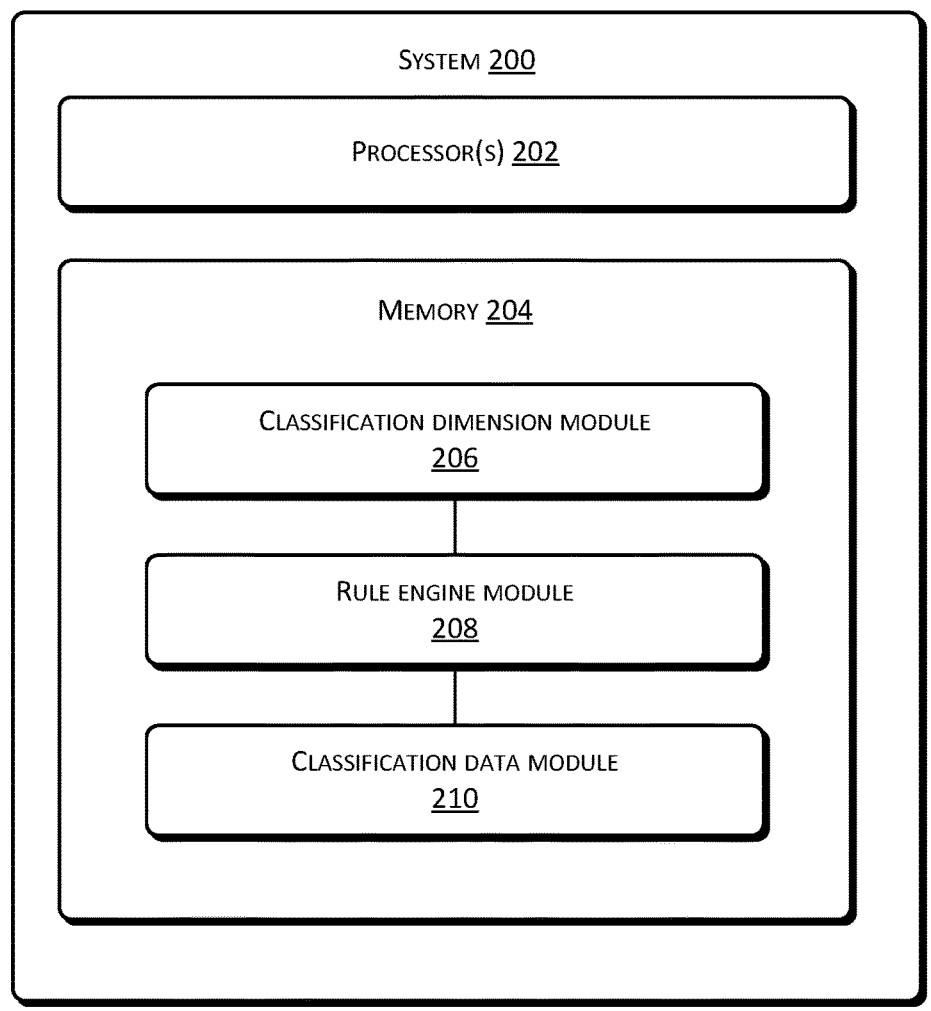
FIG. 2 illustrates a diagram of an example system of storing data classification structure in accordance with the first example embodiment of the present disclosure.

FIG. 2 illustrates a diagram of an example system 200 that stores the data classification structure in the first example embodiment. The system 200 may include multiple modules to implement functionalities. The modules may be in the form of hardware, software stored on hardware, and a combination of hardware and software. In the example of FIG. 2, the system 200 may include, but is not limited to, one or more processors 202 and memory 204.

The memory 204 may include computer storage media in the form of volatile memory, such as random-access memory (RAM) and/or non-volatile memory, such as read only memory (ROM) or flash RAM. The memory 204 is an example of computer storage media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include transitory media such as modulated data signals and carrier waves. The memory 204 may store therein program units or modules and program data.

The modules include a classification dimension module 206, a rule engine module 208, and a classification data module 210. The classification dimension module 206 obtains an initial classification structure tree to store the data classification structure. The initial classification structure tree includes an initial root node representing characteristics of a data source and at least one level child node that describe classification characteristics. One or more leaf nodes store corresponding data.

The rule engine module 208 determines the initial root node or a child node in the initial classification structure tree as an initial root node of a reorganized classification structure tree. Among remaining nodes other than the determined root node or the child node, the rule engine module 208 determines at least one node as a child node of the reorganized classification structure tree. Based on the determined root node and child node of the reorganized classification structure tree, using the corresponding data as leaf nodes of the reorganized classification structure tree, the rule engine module 208 generates the reorganized classification structure tree differently from the initial classification structure tree.

The classification date module 210 stores the initial classification structure tree and the reorganized classification structure tree. For example, the initial classification structure tree that stores the data classification structure may be generated based on a standard classification structure when the data is published.

Figure 2A:
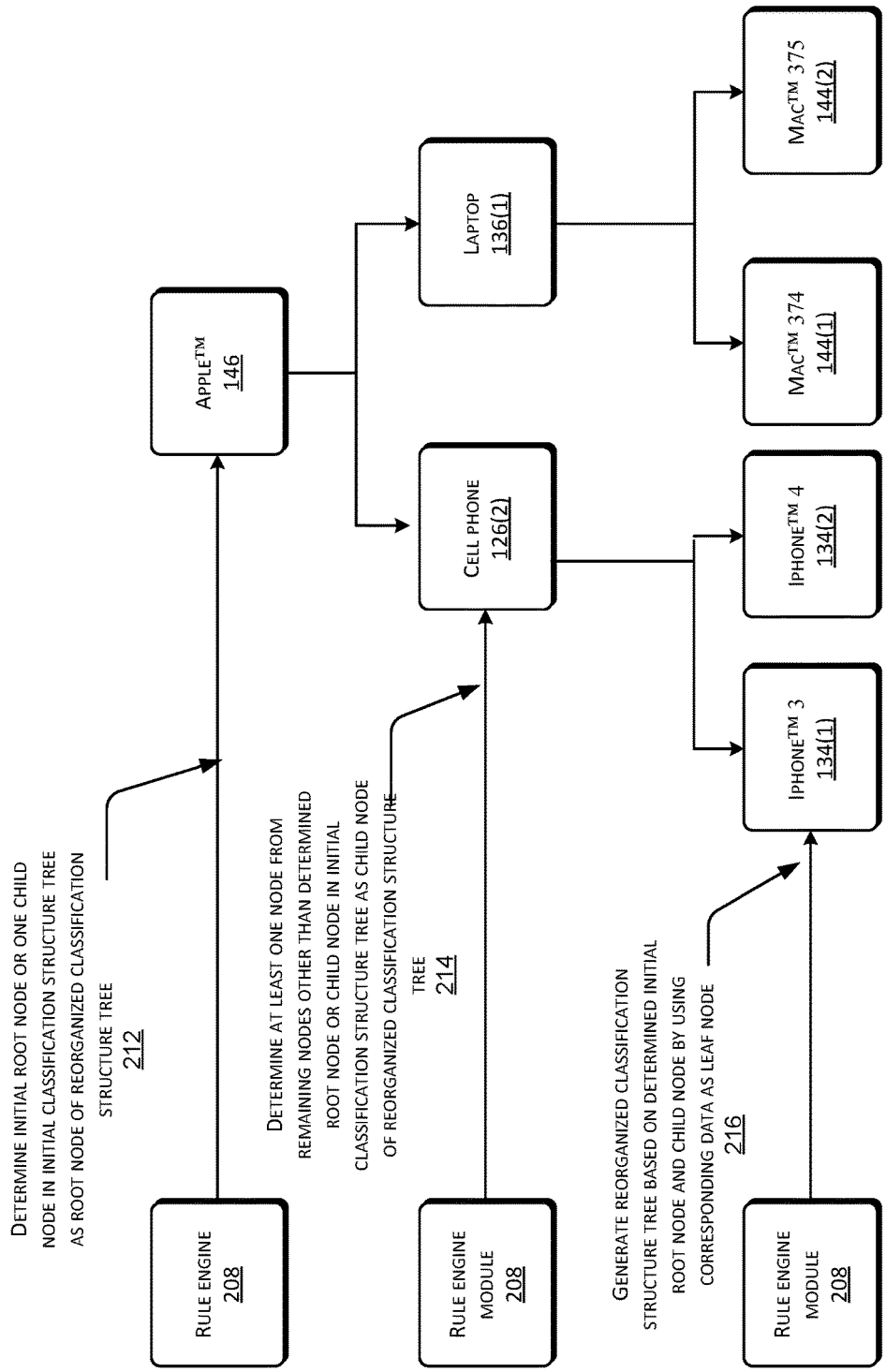
FIG. 2A illustrates a flowchart of an example process to generate the reorganized classification structure tree based on the initial classification structure tree by reference to hardware environment in accordance with the first example embodiment of the present disclosure.

FIG. 2A illustrates a flowchart of an example process that the rule engine module 208 generates the reorganized classification structure tree based on the initial classification structure tree based on the above example of the initial classification structure tree of the communication tool by reference to FIGS. 1B and 1C.

At 212, the rule engine module 208 selects the initial root node or a child node from the above initial classification structure tree of the communication tool as the root node of the reorganized classification structure tree. In one example, the Apple™ 130(2) or the Apple™ 140(1) in FIG. 1B is selected as the root node Apple™ 146 of the reorganized classification structure tree. Thus, the node Apple™ in the initial classification structure tree is used as the root node of the reorganized classification structure tree to generate the reorganized classification structure tree of the series products of Apple™.

In the above classification tree of the communication tool, the child node Apple™ 146 is determined as the root node of the reorganized classification structure tree. At 214, except for the selected child node Apple™ 130(2) or 140(1), the remaining nodes may all be used as the child nodes of the reorganized classification structure tree. Based on the above initial classification structure tree, it is determined that Apple™ includes the series of products of cell phones and laptops. Thus, the child node cell phone 126(2) and the child node laptop 136(1) may be used as the first level child nodes in the reorganized classification structure tree. At 216, a reorganized classification structure is generated based on the determined initial root node and child node using corresponding data as leaf node. The child nodes Iphone™ 3 134(1) and Iphone™ 4 134(2) in the initial classification structure tree are used as the child nodes of the first level child node cell phone 126(2) in the reorganized classification structure tree. The child nodes Mac™ 374 144(1) and Mac™ 375 144(2) in the initial classification structure tree are used as the child nodes of the first level child node laptop 136(1) in the reorganized classification structure tree.

The first example embodiment provides a method and a system of storing data classification structure. One or more present techniques, based on an initial classification structure tree, generate a reorganized classification structure tree to store the data classification structures. As the reorganized classification structure tree is flexible, when maintaining data and searching data by using the search engine, the present techniques may quickly find the desired data, thereby reducing the heavy burden of the search engine under the conventional techniques to conduct data search and high pressure of conducting data maintenance and data search. Further, the present techniques may not only reduce the burden of the search engine, but also relieve the pressure for maintaining data and searching data.

Figure 3:
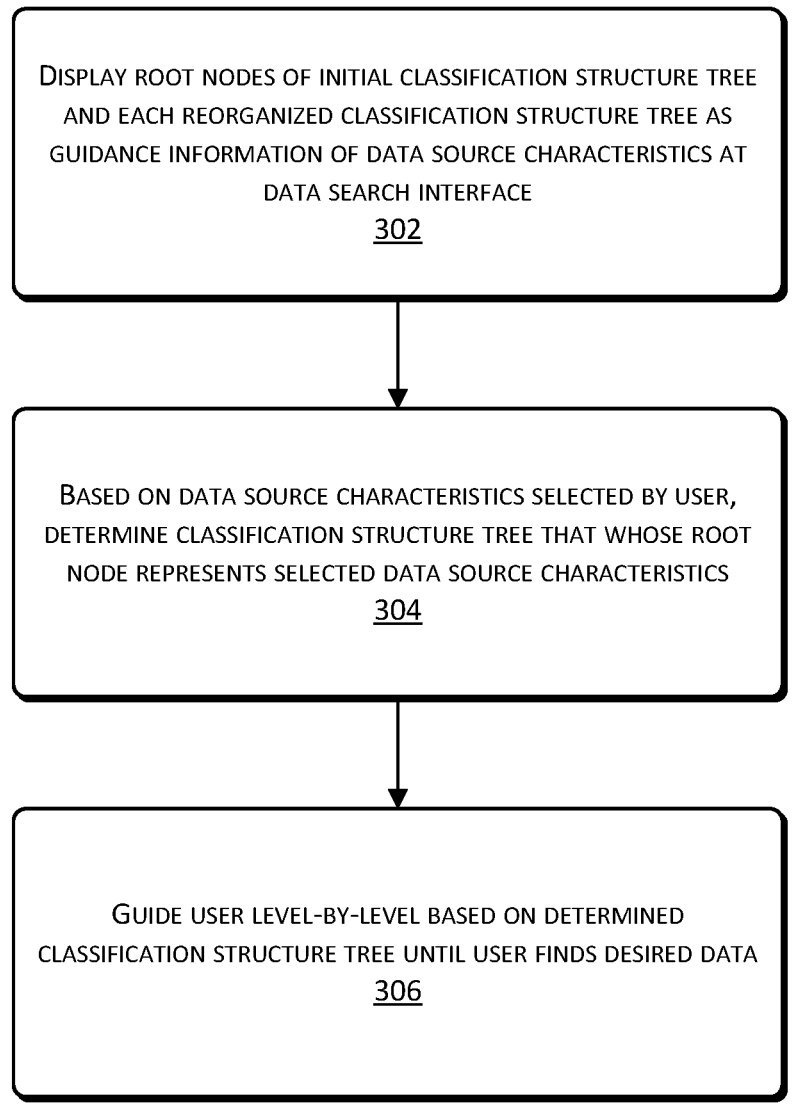
FIG. 3 illustrates a flowchart of an example method of searching data classification structure generated by an example method in the first example embodiment in accordance with a second example embodiment of the present disclosure.

A second example embodiment of the present disclosure provides a method of searching the data classification structure generated based on the example method in the first example embodiment. FIG. 3 illustrates a flowchart of an example method of searching the data classification structure.

At 302, root nodes of an initial classification structure and each reorganized classification structure tree are displayed as guidance information of data source characteristics at a display interface. At 304, based on data source characteristics selected by a user, a classification structure tree using a root node corresponding to the data source characteristics is determined. At 306, a level-by-level guidance is provided to the user based on the determined classification structure tree until the user finds desired data. For example, the initial classification structure tree that stores the data classification structure may be generated based on a standard classification structure when the data is published.

Based on the root nodes of the initial classification structure tree and each reorganized classification structure tree of the data displayed on the display interface, a root node is determined based on actual needs. When the root node is determined, its represented classification structure tree is determined. The classification structure trees include the initial classification structure tree and the reorganized classification structure tree. For example, the first level child nodes of a respective classification structure tree may be displayed at the display interface. When one child node among the first level child nodes is selected, child nodes of the selected child node is displayed at the display interface. The selection of respective child nodes may be done level by level until desired data is displayed at the display interface.

For example, when the root node Apple™ 146 of the reorganized classification structure described in FIG. 1C of the first example embodiment is used as guidance information and displayed at the display interface. After the root node Apple™ 146 is selected, the first level child nodes in the reorganized classification structure tree such as the cell phone 126(2) and the laptop 136(1) are displayed at the display interface. When the child node cell phone 126(2) is selected, its child nodes or leaf nodes will be displayed at the display interface. For example, if Iphone™ 3 134(1) as the leaf node of the child node cell phone 126(2) is selected, the leaf node Iphone™ 3 134(1) will be displayed at the display interface.

Figure 4:
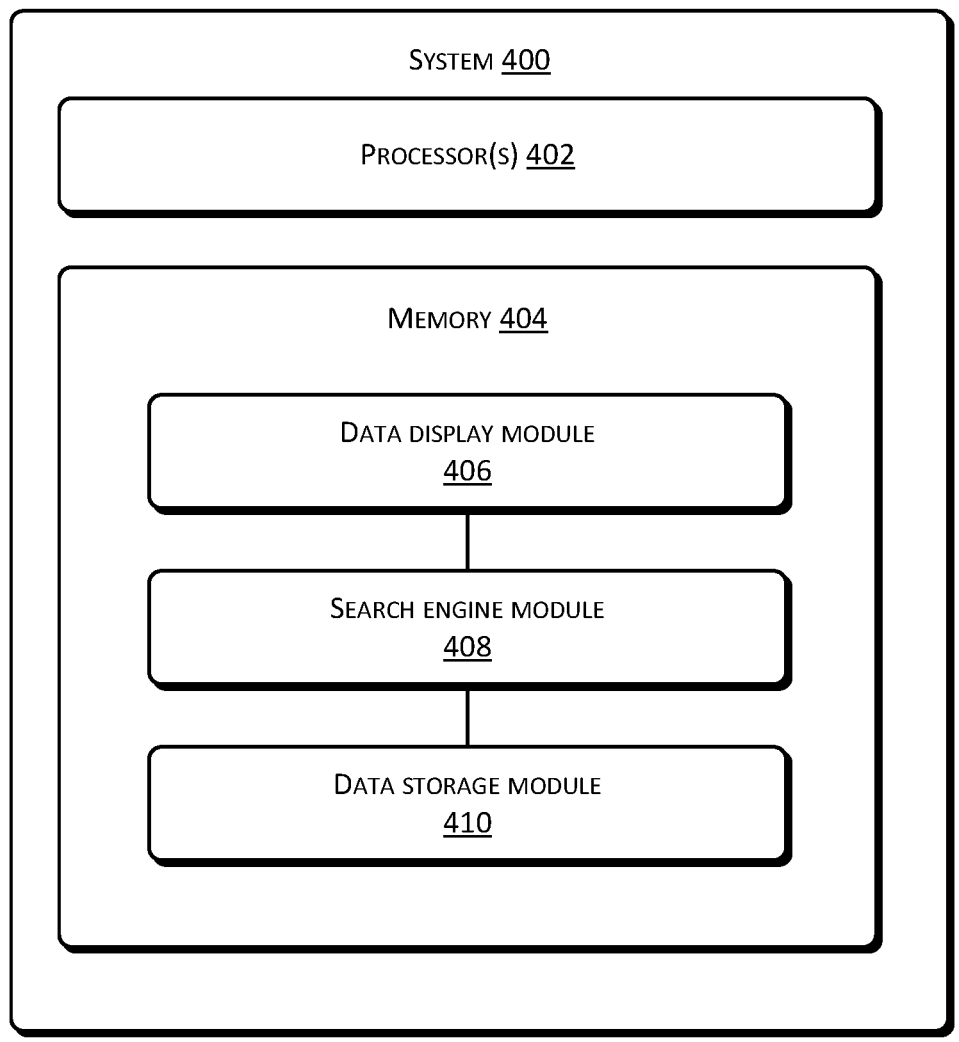
FIG. 4 illustrates a diagram of an example system of searching data classification structure generated by an example method in the first example embodiment in accordance with the second example embodiment of the present disclosure.

FIG. 4 illustrates a diagram of an example system 400 of searching the data classification structure generated based on the example method in the first example embodiment. The system 400 may include one or more processors 402 and memory 404. The memory 404 may include computer storage media and store therein program units or modules and program data. In the example of FIG. 4, the modules may include a data display module 406, a search engine module 408, and a data storage module 410.

The data display module 406 displays root nodes of an initial classification structure and each reorganized classification structure tree as guidance information of data source characteristics, such as communication tool, computer, Apple™, women cloth, etc. The search engine module 408, based on data source characteristics selected by a user, determines a classification structure tree whose root node represents the selected data source characteristics, and provides a level-by-level guidance to the user based on the determined classification structure tree until the user finds desired data. The data storage module 410 stores the data and provides the data sources. For example, the initial classification structure tree may be established based on a standard classification structure tree when the data is published.

Figure 4A:
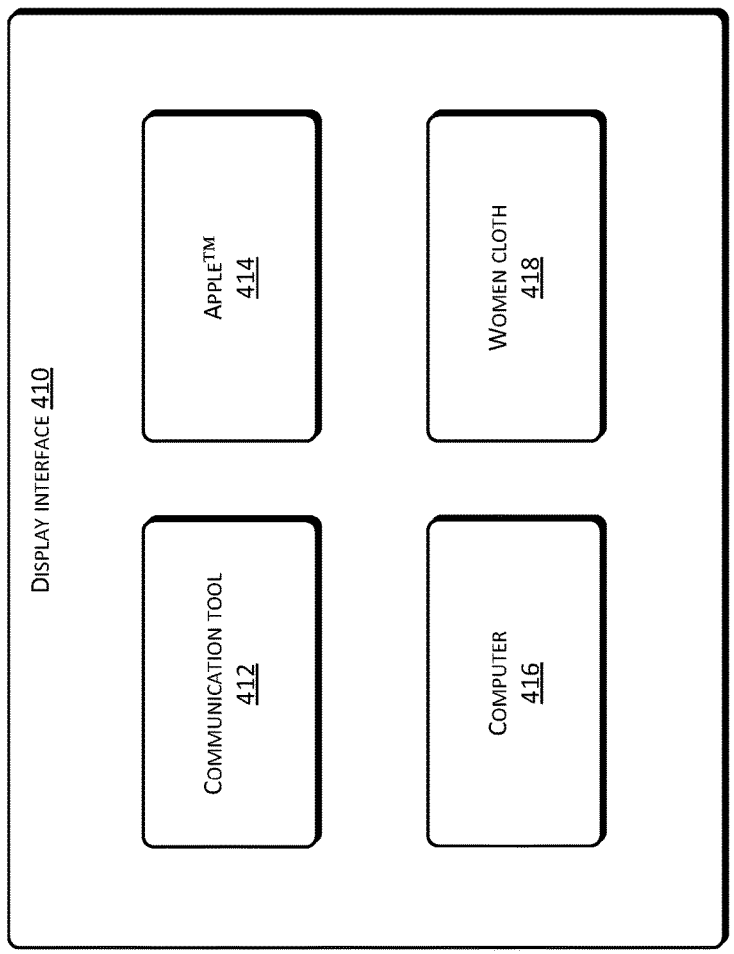
FIG. 4A illustrates a diagram of an example display interface that displays guidance information through a data display module in accordance with the second example embodiment of the present disclosure.

FIG. 4A illustrates a diagram of an example display interface that displays guidance information through the data display module 406 in accordance with the second example embodiment of the present disclosure. In the example of FIG. 4A, the data display module 406 displays the root node of the initial classification structure tree and the initial nodes of each reorganized classification structure tree at the display interface 410. Each root node is displayed as guidance information of its represented data source characteristics. In the example of FIG. 4A, the root nodes include a root node communication tool 412, a root node Apple™ 414, a root node computer 416, and a root node women cloth 418.

Figure 4B:
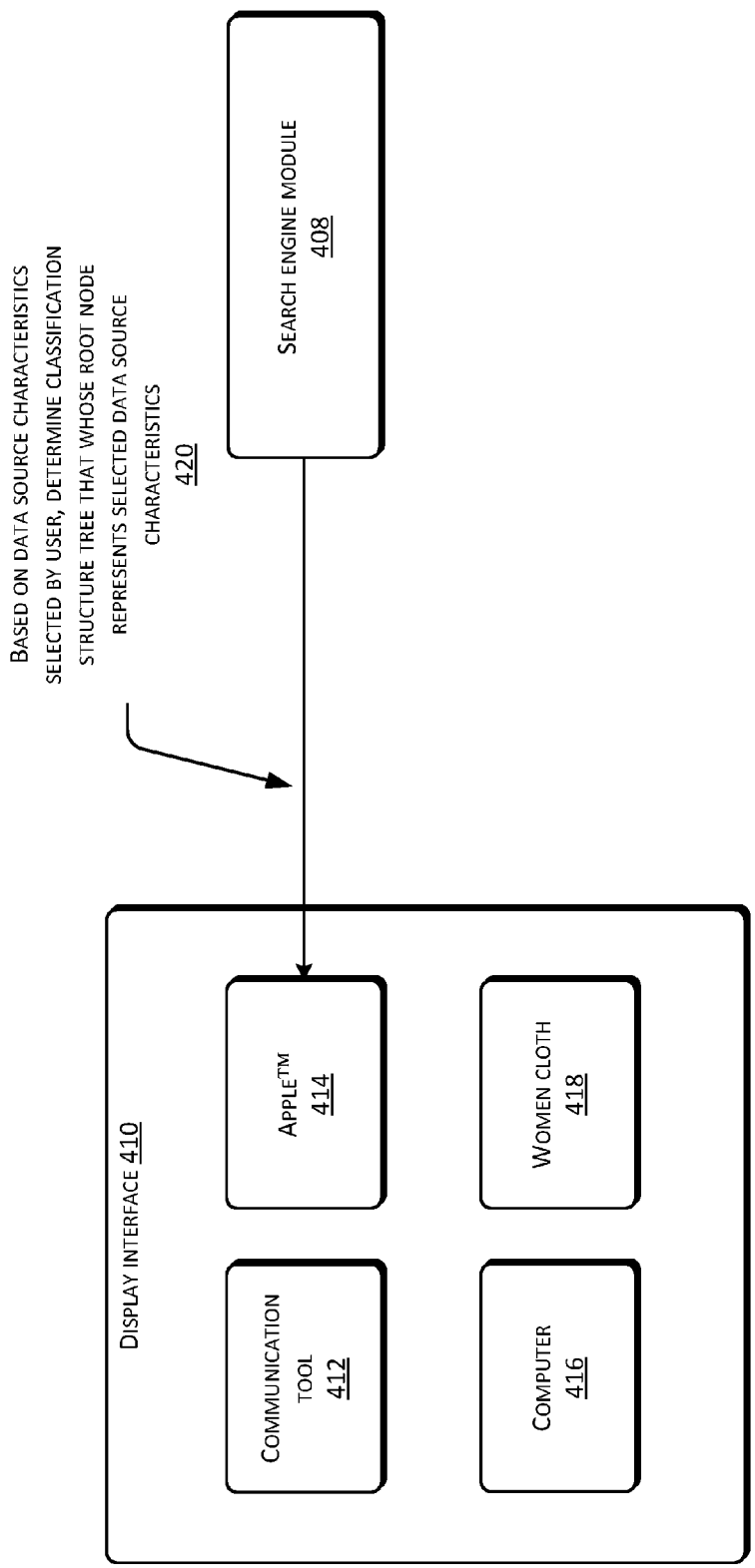
FIG. 4B illustrates a diagram of an example reorganized classification structure tree of Apple™ in accordance with the second example embodiment of the present disclosure.

FIG. 4B illustrates a diagram of an example reorganized classification structure tree of Apple™ in accordance with the second example embodiment of the present disclosure. In the example of FIG. 4B, at 420, the search engine module 408, based on data source characteristics selected by a user, determines a classification structure tree whose root node represents the selected data source characteristics. In the example of FIG. 4B, guidance information such as the root node Apple™ 414 is selected. Thus, the reorganized classification structure tree with the root node Apple™ 414 is selected.

Figure 4C:
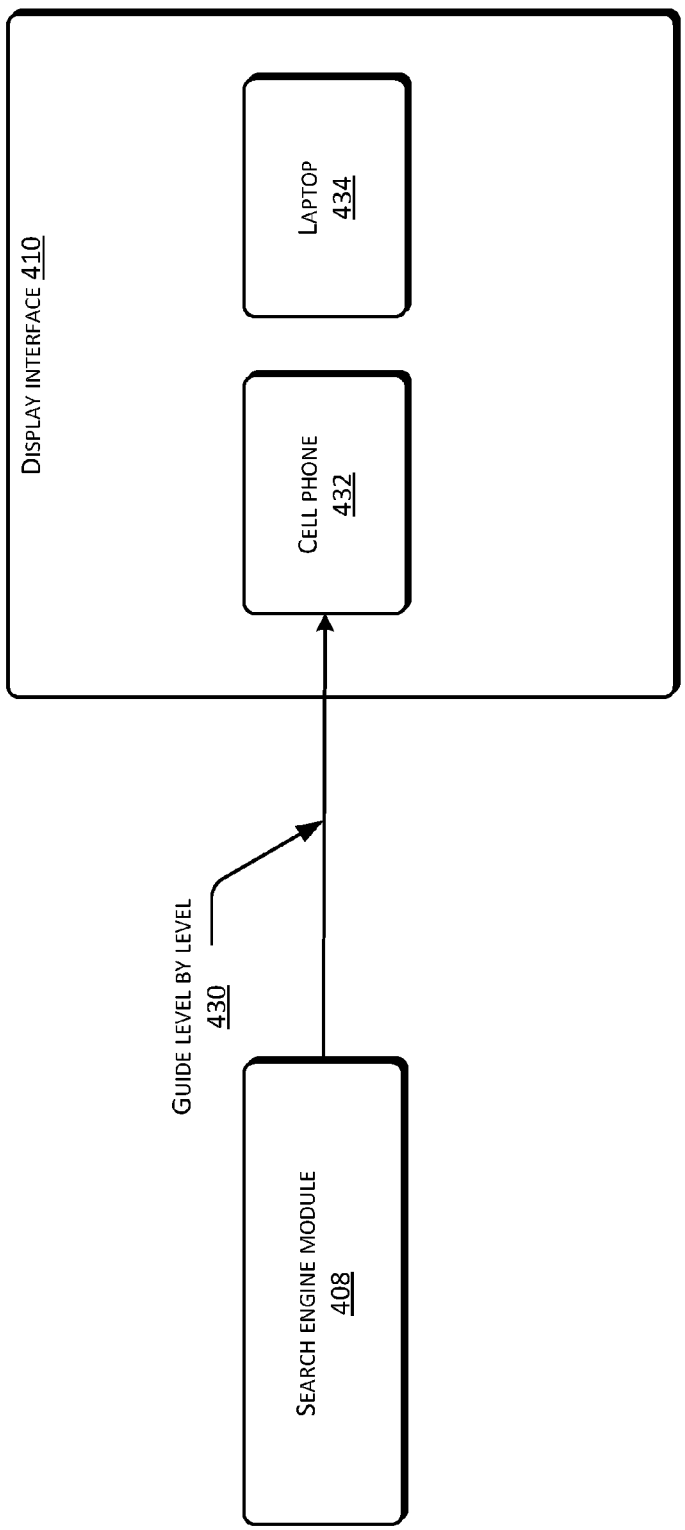
FIG. 4C illustrates a diagram of an example determination of classification structure tree through a search engine module in accordance with the second example embodiment of the present disclosure.

FIG. 4C illustrates a diagram of an example determination of classification structure tree through the search engine module 408 in accordance with the second example embodiment of the present disclosure. At 430, the search engine module 408 provides a level-by-level guidance to the user based on the determined classification structure tree, i.e., the reorganized classification structure tree with the root node Apple™ 414 until the user finds desired data. After the user selects the reorganized classification structure tree with the root node Apple™ 414, its first level child nodes such as cell phone 432 and laptop 434 are displayed at the display interface 410.

Figure 4D:
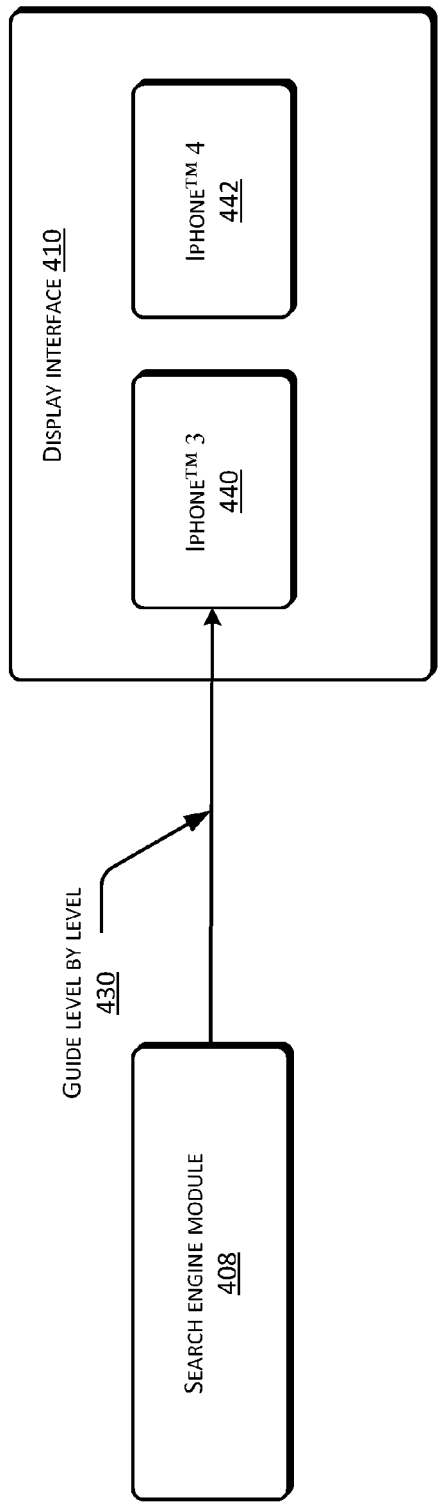
FIG. 4D illustrates a diagram of an example level-by-level guidance through the search engine module in accordance with the second example embodiment of the present disclosure.

FIG. 4D illustrates a diagram of an example level-by-level guidance through the search engine module 408 in accordance with the second example embodiment of the present disclosure. In the example of FIG. 4D, after the first level child node cell phone 432 is selected, the second level child nodes or child nodes of the first level child node cell phone 432 are displayed at the user interface, i.e., the child node Iphone™ 3 440 and the child node Iphone™ 4 442.

Figure 4E:
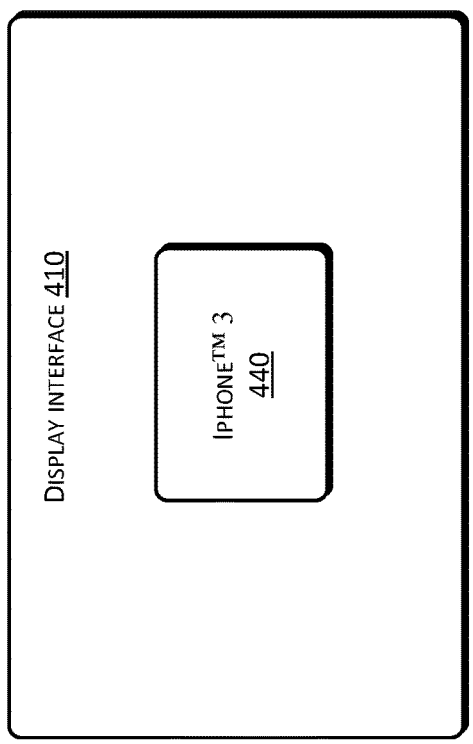
FIG. 4E illustrates a diagram of an example obtained search result by the example level-by-level guidance through the search engine module in accordance with the second example embodiment of the present disclosure.

FIG. 4E illustrates a diagram of an example obtained search result by the example level-by-level guidance through the search engine module 408 in accordance with the second example embodiment of the present disclosure. For example, if the child node Iphone™ 3 440 of the child node cell phone 432 is selected, as the child node Iphone™ 3 440 is the leaf node of the child node cell phone 432, data of the child node or leaf node Iphone™ 3 440 will be displayed at the display interface 410.

The second example embodiment provides a method and a system of searching the data classification structure generated based on the example method in the first example embodiment. One or more present techniques, based on an initial classification structure tree, generate a reorganized classification structure tree to store the data classification structures. As the reorganized classification structure tree is flexible, when maintaining data and searching data by using the search engine, the present techniques may quickly find the desired data, thereby reducing the heavy burden of the search engine under the conventional techniques to conduct data search and high pressure of conducting data maintenance and data search. Further, the present techniques may not only reduce the burden of the search engine, but also relieve the pressure for maintaining data and searching data.

A person of ordinary skill in the art would appreciate that the modules, operations, or steps in the present disclosure may be implemented through one or more computing devices. They may be performed by one single computing device or distributed among a network composed of multiple computing devices. Optionally, they may be in the form of computer-executable instructions performed by the one or more computing devices or processors and stored at one or more computer storage media. The sequence of the operations or steps as described in the present disclosure are just for illustration purpose and different sequences or parallel sequences may be performed in some other examples. The modules, operations, or steps may be embodied in various integrated circuits respectively. Alternatively, multiple modules, operations, or steps may be embodied into one integrated circuit. The present disclosure is not limited to a combination of any specific hardware and/or software.

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a device of implementing one or more flows of the flow chart and/or one or more blocks of the block diagram can be generated through the instructions operated by a computer or other programmable data processors.

These computer program instructions can also be stored in other computer-readable storage media which can instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions can also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The embodiments are merely for illustrating the present disclosure and are not intended to limit the scope of the present disclosure. It should be understood for persons in the technical field that certain modifications and improvements can be made and should be considered under the protection of the present disclosure without departing from the principles of the present disclosure.

What is claimed is:

1. A method comprising:
   generating an initial classification structure tree that includes an initial root node and a plurality of initial child nodes;
   generating a reorganized classification structure tree, wherein generating the reorganized classification structure tree comprises:
      selecting one of the initial child nodes as a reorganized root node of the reorganized classification structure tree; and
      selecting one or more of the initial child nodes as a set of reorganized child nodes of the reorganized classification structure tree, wherein the reorganized child nodes include at least one parent node of the initial child node selected as the reorganized root node;
   displaying the initial root node and the reorganized root node;
   receiving a selection of the reorganized root node;
   generating at least one secondary reorganized classification structure tree based on the selection of the reorganized root node;
   displaying a root node of the at least one secondary reorganized classification structure tree; and
   providing level-by-level guidance to a user based on the reorganized classification structure tree and the secondary reorganized classification structure tree.

2. The method as recited in claim 1, wherein the providing the level-by-level guidance to the user based on the reorganized classification structure tree and the secondary reorganized classification structure tree comprises providing the level-by-level guidance to the user based on the reorganized classification structure tree and the secondary reorganized classification structure tree until desired data is selected by the user.

3. The method as recited in claim 1, wherein the initial classification structure tree is generated based on a standard classification structure tree when data is published.

4. The method as recited in claim 1, wherein:
   the initial root node of the initial classification structure tree represents data source characteristics of the initial classification structure tree; and
   at least one child node of the initial classification structure tree describes classification characteristics of a corresponding classification in the initial classification structure tree.

5. The method as recited in claim 1, wherein the reorganized root node represents data source characteristics of the reorganized classification structure tree.

6. The method as recited in claim 1, wherein the initial classification structure tree and the reorganized classification structure tree are a same type.

7. The method as recited in claim 1, wherein the initial classification structure tree and the reorganized classification structure tree are different types.

8. A system comprising:
one or more processors; and
one or more computer storage media having stored thereon computer-executable instructions that are executable by the one or more processors to perform acts comprising:
generating an initial classification structure tree that includes an initial root node and a plurality of initial child nodes;
generating a reorganized classification structure tree, wherein generating the reorganized classification structure tree comprises:
selecting one of the initial child nodes as a reorganized root node of the reorganized classification structure tree; and
selecting one or more of the initial child nodes as a set of reorganized child nodes of the reorganized classification structure tree, wherein the reorganized child nodes include at least one parent node of the initial child node selected as the reorganized root node;
displaying the initial root node and the reorganized root node;
receiving a selection of the reorganized root node;
generating at least one secondary reorganized classification structure tree based on the selection of the reorganized root node;
displaying a root node of the at least one secondary reorganized classification structure tree; and
providing a level-by-level guidance to a user based on the reorganized classification structure tree and the secondary reorganized classification structure tree.

9. The system as recited in claim 8, wherein the providing the level-by-level guidance to the user based on the reorganized classification structure tree and the secondary reorganized classification structure tree includes providing the level-by-level guidance to the user based on the reorganized classification structure tree and the secondary reorganized classification structure tree until desired data is selected by the user.

10. The system as recited in claim 8, wherein the initial classification structure tree is generated based on a standard classification structure tree when data is published.

11. The system as recited in claim 8, wherein:
the initial root node of the initial classification structure tree represents data source characteristics of the initial classification structure tree; and
at least one child node of the initial classification structure tree describes classification characteristics of a corresponding classification in the initial classification structure tree.

12. The system as recited in claim 8, wherein the reorganized root node represents data source characteristics of the reorganized classification structure tree.

13. The system as recited in claim 8, wherein the initial classification structure tree and the reorganized classification structure tree are a same type.

14. The system as recited in claim 8, wherein the initial classification structure tree and the reorganized classification structure tree are different types.

15. The system as recited in claim 8, wherein the system is a distributive system.

16. One or more computer storage media having stored thereon computer-executable instructions that are executable by the one or more processors to perform acts comprising:
generating an initial classification structure tree that includes an initial root node and a plurality of initial child nodes;
generating a reorganized classification structure tree, wherein generating the reorganized classification structure tree comprises:
selecting one of the initial child nodes as a reorganized root node of the reorganized classification structure tree; and
selecting one or more of the initial child nodes as a set of reorganized child nodes of the reorganized classification structure tree, wherein the reorganized child nodes include at least one parent node of the initial child node selected as the reorganized root node;
displaying the initial root node and the reorganized root node;
receiving a selection of the reorganized root node;
generating at least one secondary reorganized classification structure tree based on the selection of the reorganized root node;
displaying a root node of the at least one secondary reorganized classification structure tree; and
providing a level-by-level guidance to a user based on the reorganized classification structure tree and the secondary reorganized classification structure tree.

17. The one or more computer storage media as recited in claim 16, wherein the providing the level-by-level guidance to the user based on the reorganized classification structure tree and the secondary reorganized classification structure tree comprises providing the level-by-level guidance to the user based on the reorganized classification structure tree and the secondary reorganized classification structure tree until desired data is selected by the user.

18. The one or more computer storage media as recited in claim 16, wherein the initial classification structure tree is generated based on a standard classification structure tree when data is published.

19. The one or more computer storage media as recited in claim 16, wherein:
the initial root node of the initial classification structure tree represents data source characteristics of the initial classification structure tree; and
at least one child node of the initial classification structure tree describes classification characteristics of a corresponding classification in the initial classification structure tree.

20. The one or more computer storage media as recited in claim 16, wherein the root node of the reorganized classification structure tree represents data source characteristics of the reorganized classification structure tree.

* * * * *